United States Patent
Colin

(10) Patent No.: US 7,114,407 B1
(45) Date of Patent: Oct. 3, 2006

(54) ACTUATOR ASSEMBLY

(75) Inventor: Eric Colin, Luneville (FR)

(73) Assignee: Meritor Light Vehicle Systems (UK) Ltd., Birmingham (GB)

( * ) Notice: Subject to any disclaimer, the term of this patent is extended or adjusted under 35 U.S.C. 154(b) by 779 days.

(21) Appl. No.: 09/830,096

(22) PCT Filed: Oct. 21, 1999

(86) PCT No.: PCT/IB99/01748

§ 371 (c)(1),
(2), (4) Date: Nov. 6, 2002

(87) PCT Pub. No.: WO00/24995

PCT Pub. Date: May 4, 2000

(30) Foreign Application Priority Data

Oct. 24, 1998 (GB) .................................. 9823220.0

(51) Int. Cl.
*F16H 27/02* (2006.01)
(52) U.S. Cl. ..................................... 74/89.18; 74/89.19
(58) Field of Classification Search ............... 74/89.17, 74/89.18, 89.19, 422, 409
See application file for complete search history.

(56) References Cited

U.S. PATENT DOCUMENTS

| | | | | |
|---|---|---|---|---|
| 4,573,723 A | * | 3/1986 | Morita et al. | 292/336.3 |
| 4,617,812 A | * | 10/1986 | Rogers | 70/218 |
| 5,009,296 A | * | 4/1991 | Ohkawa et al. | 74/664 |
| 5,439,261 A | * | 8/1995 | O'Hare | 292/336.3 |
| 5,441,317 A | * | 8/1995 | Gruden et al. | 292/336.3 |
| 5,584,515 A | * | 12/1996 | Silye | 292/201 |

FOREIGN PATENT DOCUMENTS

WO    WO 90/05822    *    5/1990

* cited by examiner

*Primary Examiner*—David Fenstermacher
(74) *Attorney, Agent, or Firm*—Carlson, Gaskey & Olds

(57) ABSTRACT

An actuator assembly (10) including a motor (1) having a body portion (14) and a drive shaft (16), the drive shaft being drivably connected to a pinion (18), the pinion drivingly engaging an array of gear teeth (20) of a gear rack (22) the array of gear teeth having a first side (21) adjacent the motor, in which the gear rack is pivotally mounted via a pivot about a pivot axis (25A) on said first side (21) of the array of gear teeth (20).

19 Claims, 3 Drawing Sheets

ACTUATOR ASSEMBLY

BACKGROUND OF THE INVENTION

The present invention relates to actuator assemblies and in particular electrical actuators used to actuate components, for example door locks, door latches or door deadlocks in vehicles.

SUMMARY OF THE INVENTION

It is an object of the present invention to provide a compact actuator assembly. It is a further object to provide an actuator assembly that is easy to install. It is a further object to provide an actuator assembly that has relatively few components and is relatively cheap to produce.

Thus according to the present invention there is provided an actuator assembly including a motor having a body portion and a drive shaft, the drive shaft being drivably connected to a pinion, the pinion drivingly engaging an array of gear teeth of a gear rack the array of gear teeth having a first side adjacent the motor, in which the gear rack is pivotally mounted via a pivot about a pivot axis on said first side of the array of gear teeth.

Preferably the pivot axis passes through the body and/or is proximate that end of the motor remote from the pinion.

Preferably the gear rack includes at least one stop to limit movement of the rack relative to the body portion and preferably the drive shaft passes between the array of gear teeth and a guide portion proximate the gear teeth.

Preferably each stop supports the guide portion.

According to a further aspect of the invention there is provided an actuator assembly including a motor having a body portion and a drive shaft, the drive shaft being drivably connected to a pinion, the pinion drivingly engaging an assay of gear teeth of a gear rack with the gear rack being mounted for movement on the body portion.

Preferably the motor is an electric motor.

BRIEF DESCRIPTION OF THE DRAWINGS

The invention will now be described by way of example only with reference to the drawings in which; —

FIG. 1A is a schematic view of a top portion of a housing;

FIG. 1B is a schematic view of a bottom portion of the housing;

FIG. 1C is a partial cross-sectional view of the housing supporting a drive shaft of the motor

DETAILED DESCRIPTION OF THE PREFERRED EMBODIMENT

Figure 1:
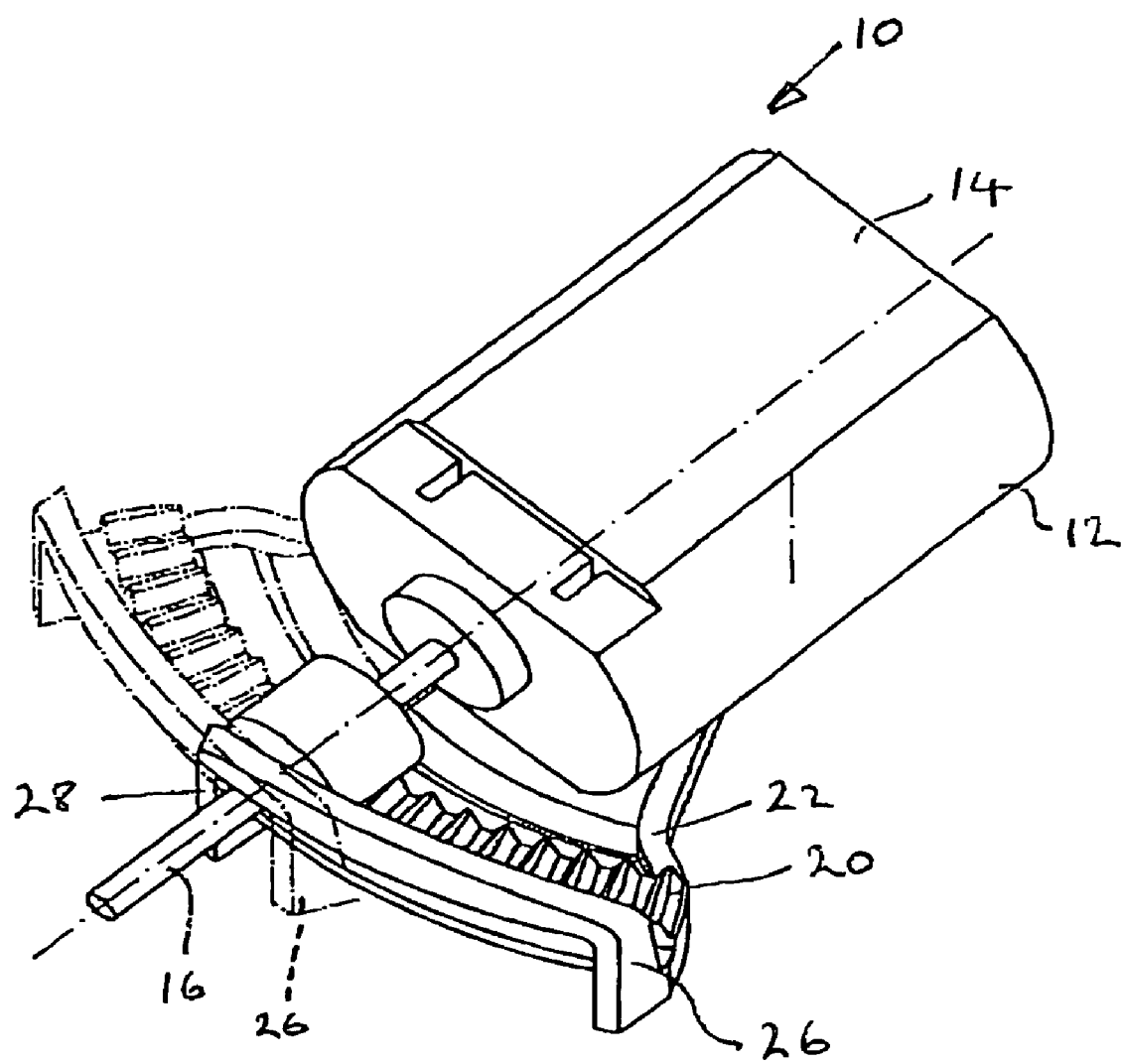
FIG. 1 is an isometric view of a top side of the present invention.
Figure 2:
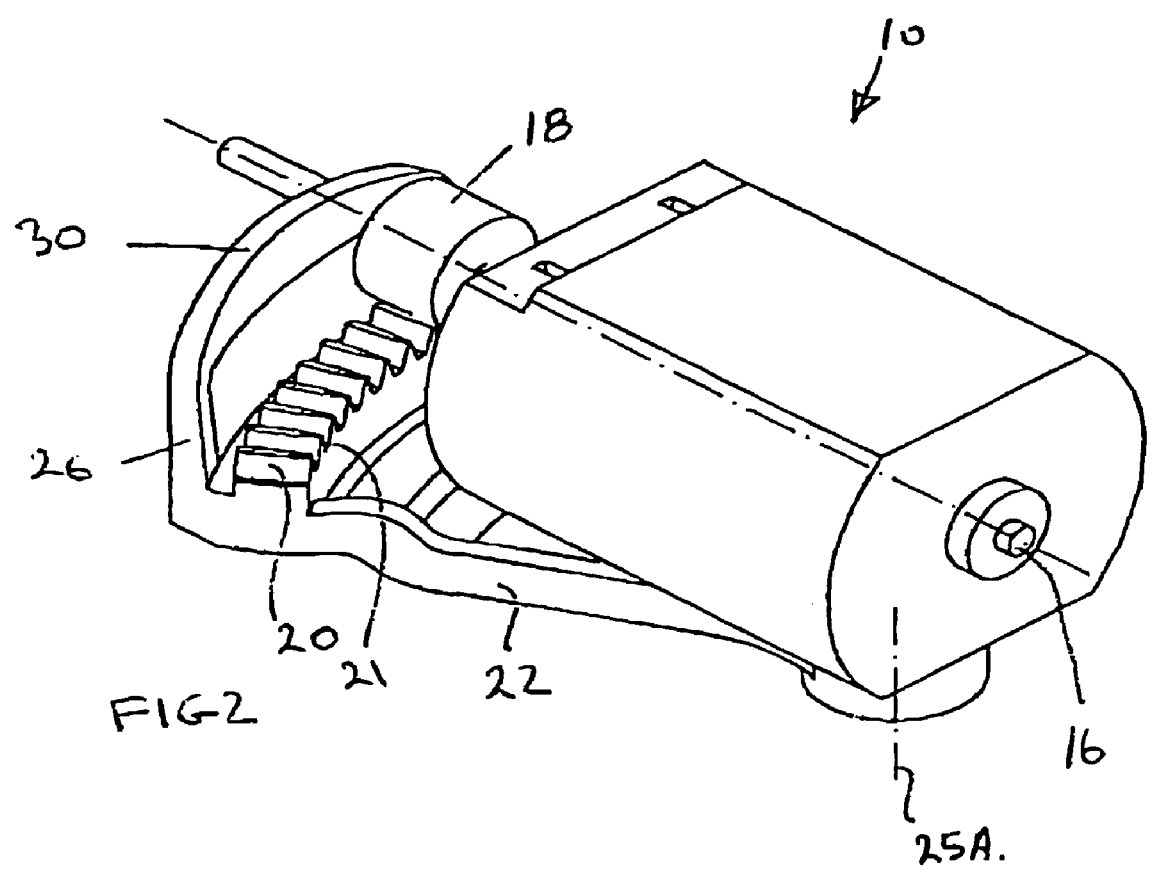
FIG. 2 is a isometric view of a back side of the present invention.
Figure 3:
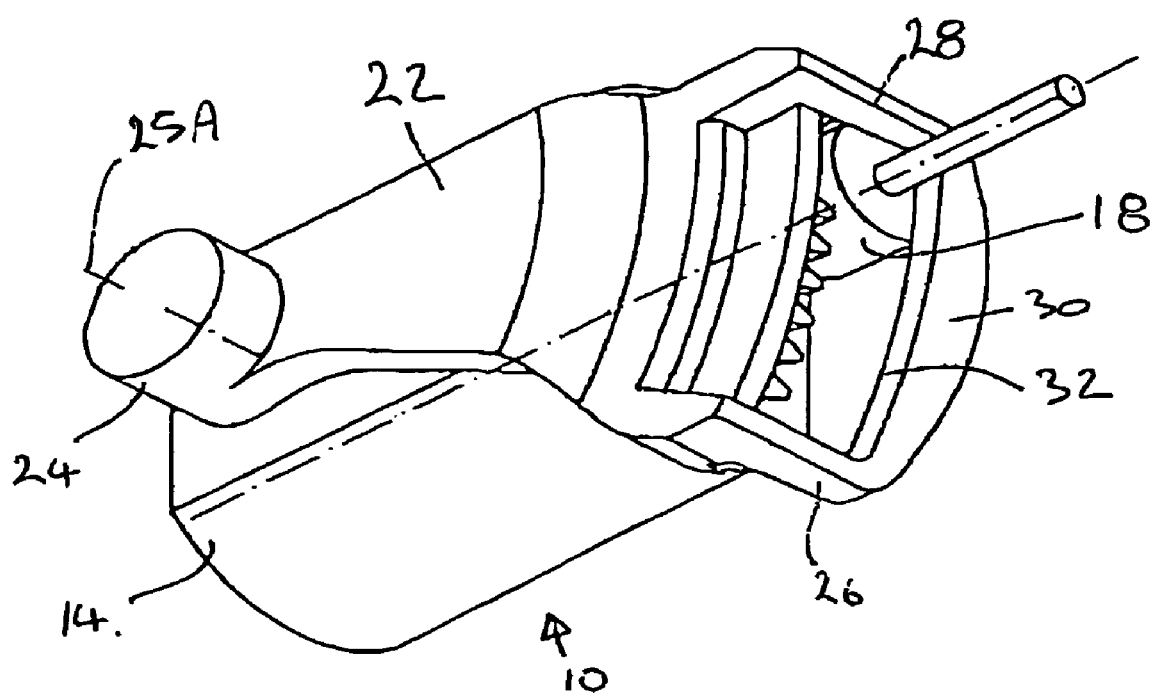
FIG. 3 is an isometric view of a bottom side of the present invention.

With reference to FIGS. 1–3 there is shown an actuator assembly 10 which includes a motor 12 (in this case an electric motor). The motor includes a body portion 14 and a drive shaft 16. The drive shaft is drivably connected to a pinion 18. The pinion 18 drivingly engages an array of gear teeth 20 fixed to a gear rack 22.

The gear rack is of generally octant shape with the array of gear teeth 20 being arranged in an arcuate manner. The array of gear teeth have a first side 21 adjacent the motor. The gear rack includes a boss 24 which fits into a hole 40 of a housing 42 to provide a pivot. Gear rack 22 thus can rotate about axis 25A of boss 24. It should be noted the axis 25A passes through body portion 14.

The housing 42 substantially surrounds the motor and gear rack and can be substantially sealed against the ingress of contaminants eg. dirt, dust, or water. The motor is secured in the housing 42, preferably by engagement of each end of the drive shaft with the housing 42.

Preferably the housing 42 is of at least two part form, a first part 44 having two cut-outs 46 (only one of which is shown), each cut-out 46 accepting and supporting one end of the drive shaft, a second part 48 having complementary cut-outs 50 (only one of which is shown) which in conjunction with the cut-outs of the first part 44 provide a journal bearing for each end of the drive shaft 16. The second part 48 also has a hole 40 to accept and provide a journal for boss 24.

In use the boss 24 is connected to a lever 52 situated on the outside of the housing 42. The lever 52 being connected to the component to be actuated.

Extending beyond the gear teeth 20 there are two stops 26 and 28 which limit movement of the gear rack relative to the body portion 14 by engagement with the drive shaft 16. FIG. 1 shows the gear rack 22 at an extreme position wherein stop 28 has engaged drive shaft 16. FIG. 1 also shows (in chain dotted line) the other extreme of movement of the gear rack relative to the body portion wherein stop 26 has engaged drive shaft 16.

Guide portion 30 connects stops 26 and 28, resulting in a stronger arrangement. Guide portion 30 is mounted on the opposite side of shaft 16 to the array of gear teeth 20. Guide portion 30 includes a guide surface 32 along which the drive shaft 16 passes in close proximity or alternatively in light engagement therewith. When the motor 12 is producing torque the engagement of the pinion with appropriate gear teeth of the array causes a separating force which preferably can be counteracted by the guide surface 32 acting upon the drive shaft 16, thus reducing the load as seen by the pivot 25.

In use operation of the motor in a first rotational direction causes the pinion to move the gear rack to a first position and operation of the motor in a second rotational direction causes the pinion to move the gear rack to a second position.

In further embodiments the gear rack can be of an alternative segment shape such as a quadrant or a sextant and in yet further embodiments the gear rack need not be of a segment shape.

The invention provides for a particularly compact arrangement since a substantial part of the gear rack can be arranged to lie alongside the motor. Furthermore the actuator assembly is axially compact, it being noted that no part of the gear rack projects beyond that end of the drive shaft having the pinion secured thereto. It should also be noted that the actuator shown in the figures only has two moving parts namely the drive shaft/pinion and the gear rack.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An actuator assembly including a motor having a body portion, a drive shaft, and a pinion directly fixed to the drive shaft to always rotate in unison with the drive shaft, the pinion drivingly engaging an array of gear teeth of a gear rack, the array of gear teeth having a first side adjacent the motor, and the gear rack is pivotally mounted via a pivot for movement about a pivot axis wherein said pivot axis is on a motor side of said array of gear teeth.

2. The actuator assembly as recited in claim 1 in which the pivot axis passes through the body portion.

3. The actuator assembly as recited in claim 1 in which the pivot axis is proximate an end of the motor remote from the pinion.

4. The actuator assembly as recited in claim 1 in which the gear rack includes at least one stop to limit movement of the rack relative to the body portion.

5. The actuator assembly as recited in claim 4 in which each stop engages the drive shaft.

6. The actuator assembly as recited in claim 5 in which each stop engages a portion of the drive shaft on the side of the pinion remote from the motor.

7. The actuator assembly as recited in claim 4 in which the drive shaft passes between the array of gear teeth and a guide portion proximate the gear teeth.

8. The actuator assembly as recited in claim 7 in which the guide portion is supported by each stop.

9. The actuator assembly as recited in claim 1 which further includes a housing in which the motor is secured.

10. The actuator assembly as recited in claim 9 in which the pivot is mounted on the housing.

11. The actuator assembly as recited in claim 9 in which the pivot includes a boss of the gear rack to which in use a lever is attached.

12. The actuator assembly as recited in claim 11 in which the boss at least partially projects through the housing.

13. The actuator assembly as recited in claim 9 in which the drive shaft engages the housing.

14. The actuator assembly as recited in claim 9 in which the housing is substantially scaled.

15. The actuator assembly as recited in claim 9 in which the housing has at least a first and second part, the parts having cooperating cut-outs to provide for at least one end of the drive shaft.

16. The actuator assembly as recited in claim 1 in which the pivot is mounted on the body portion.

17. An actuator assembly including a motor having a body portion, a drive shaft, and a pinion directly fixed to the drive shaft to always rotate in unison with the drive shaft, the pinion drivingly engaging an array of gear teeth of a gear rack with the gear rack mounted for movement on the body portion.

18. The actuator assembly as recited in claim 17 in which the motor is an electric motor.

19. An actuator assembly comprising a motor having a body portion and a drive shaft, the drive shaft being drivably connected to a pinion, the pinion drivingly engaging an array of gear teeth of a gear rack pivotally mounted for movement about a pivot axis, the array of gear teeth having a first side adjacent the motor and at least one stop engaging the drive shaft to limit movement of the gear rack relative to the body portion.

\* \* \* \* \*

UNITED STATES PATENT AND TRADEMARK OFFICE
CERTIFICATE OF CORRECTION

PATENT NO.       : 7,114,407 B1  
APPLICATION NO.  : 09/830096  
DATED            : October 3, 2006  
INVENTOR(S)      : Eric Colin It is certified that error appears in the above-identified patent and that said Letters Patent is hereby corrected as shown below:

Claim 1, Column 3, lines 10-11: Delete --for movement--

Claim 14, Column 4, line 9: "scaled" should be --sealed--

Claim 15, Column 4, line 12: "cooperating" should be --co-operating--

Signed and Sealed this

Twenty-sixth Day of December, 2006

JON W. DUDAS  
*Director of the United States Patent and Trademark Office*